United States Patent
Chye et al.

(10) Patent No.: US 9,460,737 B2
(45) Date of Patent: Oct. 4, 2016

(54) SUPERMALLOY AND MU METAL SIDE AND TOP SHIELDS FOR MAGNETIC READ HEADS

(71) Applicant: Headway Technologies, Inc., Milpitas, CA (US)

(72) Inventors: Yewhee Chye, Hayward, CA (US); Kunliang Zhang, Fremont, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 117 days.

(21) Appl. No.: 13/865,269

(22) Filed: Apr. 18, 2013

(65) Prior Publication Data

US 2014/0315045 A1    Oct. 23, 2014

(51) Int. Cl.
*G11B 5/39* (2006.01)
*G11B 5/11* (2006.01)
*G11B 5/115* (2006.01)

(52) U.S. Cl.
CPC ............. *G11B 5/11* (2013.01); *G11B 5/112* (2013.01); *G11B 5/115* (2013.01); *G11B 5/398* (2013.01); *G11B 5/3912* (2013.01); *Y10T 428/1171* (2015.01)

(58) Field of Classification Search
None
See application file for complete search history.

(56) References Cited

U.S. PATENT DOCUMENTS

| | | | |
|---|---|---|---|
| 5,053,705 A | 10/1991 | Herko | |
| 6,279,827 B1 | 8/2001 | Yeckley | |
| 6,614,084 B1 | 9/2003 | Cowburn et al. | |
| 6,788,502 B1 | 9/2004 | Gill | |
| 8,027,116 B2 | 9/2011 | Huang et al. | |
| 9,230,577 B2* | 1/2016 | Zhang | G11B 5/3932 |
| 2003/0227725 A1* | 12/2003 | Macken et al. | 360/324.12 |
| 2007/0030603 A1* | 2/2007 | Sato | B82Y 25/00 360/324 |
| 2010/0039734 A1* | 2/2010 | Hara et al. | 360/319 |
| 2011/0051291 A1 | 3/2011 | Miyauchi et al. | |
| 2014/0153138 A1* | 6/2014 | Le et al. | 360/294 |
| 2014/0293474 A1* | 10/2014 | Yamane et al. | 360/75 |

OTHER PUBLICATIONS

Co-pending US Patent HT 12-020, U.S. Appl. No. 13/785,227, filed Mar. 5, 2013, "Thin Seeded Antiferromagnetic Coupled Side Shield for Sensor Biasing Applications," by K. Zhang et al., 31 pgs.
IEICE Technical Committee Submisison System,Conference Paper's Information, "An Areal-Density Capability Study of SMR by Using Improved Write and Read Heads," by T. Kagami et al., Nov. 18, 2011, p. 1.

* cited by examiner

*Primary Examiner* — Kevin Bernatz
(74) *Attorney, Agent, or Firm* — Saile Ackerman LLC; Stephen B. Ackerman

(57) ABSTRACT

The use of supermalloy-like materials for the side and top shields of a magnetic bit sensor is shown to provide better shielding protection from stray fields because of their extremely high permeability.

6 Claims, 1 Drawing Sheet

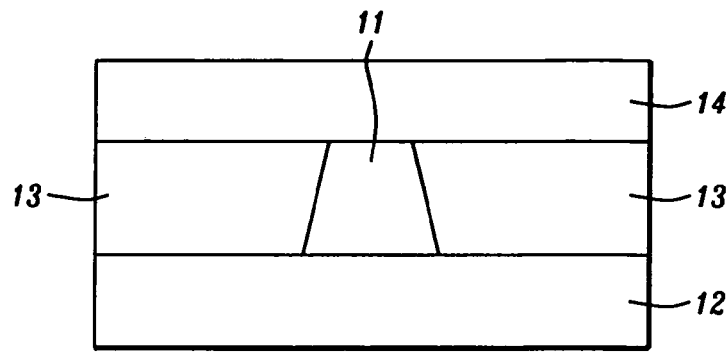
FIG. 1 – Prior Art
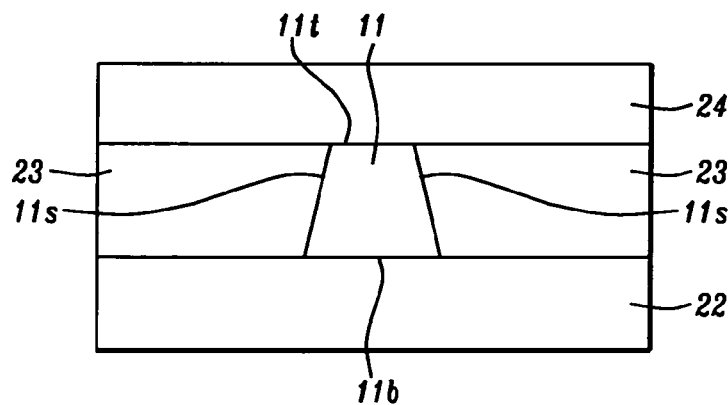
FIG. 2
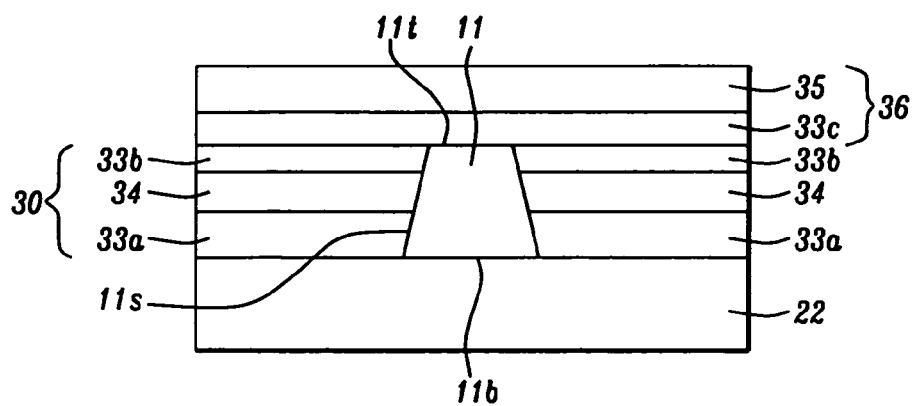
FIG. 3 though the bit size shrinks into
the nanometer range, interference from nearby bits onto the
sensor will result in higher level of noise on the read back
signal. Therefore, it is necessary to have a good shielding

SUPERMALLOY AND MU METAL SIDE AND TOP SHIELDS FOR MAGNETIC READ HEADS

TECHNICAL FIELD

The information disclosed below relates to the general field of magnetic shields for magnetic bit sensors.

BACKGROUND

In order to keep pace with the demands of data storage in today's information technology, the recording density in disk drives has continued to advance. Current hard disk drive technology uses a magnetic tunneling junction (MTJ) in the read head for reading/sensing purposes. A MTJ includes an antiferromagnetic layer, a synthetic antiferromagnetic structure that serves as a reference layer, a magnetic tunneling barrier, and a free magnetic layer that serves as a storage layer.

An MTJ needs to be processed in such a way that the width of the sensor matches the size of the recorded bit stored in the media which is in the scale of nanometers. As a result, the read-back signal will be subject to a significant level of interference from stray fields coming from nearby bits in the media. Additionally, the high reading speed used in today's technology will significantly raise the noise level.

Also, a hard magnetic film is often used to apply a biasing field to the free layer to stabilize its direction of magnetization. This technique is often called hard bias (HB). There are two major approaches in the existing technology for the side shields namely (1) hard magnetic materials as in the hard bias magnets and (2) permalloy NiFe. For the top shield, most designs use permalloy (NiFe).

Shown in FIG. 1 is the basic structure used in the prior art. Seen there is magnetic bit sensor 11 resting on lower shield 12 and surrounded by side shield 13 and top shield 14.

As the sensor width shrinks into the nanometer range, HB encounters the following problems:

(1) The biasing field becomes so strong that movement of the free layer magnetization is constrained. The result of this is that the read back signal has low amplitude.

(2) The hard magnetic film cannot adequately shield the sensor from bits near to the bit that is being read.

SUMMARY

It has been an object of at least one embodiment of the present disclosure to provide a method for fully shielding a magnetic bit sensor from noise generated by recorded bits other than the magnetic bit that is being sensed Another object of at least one embodiment of the present disclosure has been to overcome shielding difficulties associated with the presence of the hard bias magnets.

These objects have been achieved by providing shields made of materials that have very high magnetic permeability mu or very low coercivity. These high mu shields may be laminated together with other layers that serve different purposes such as providing a means to tune the biasing field for the free layer when laminated with other high moment magnetic layers.

BRIEF DESCRIPTION OF THE DRAWINGS

FIG. 1. Typical design of a read head with sensor, bottom shield, side shield and top shield.

FIG. 2. A single layer of NiFeMe is use in the side and/or top shield.

FIG. 3. Laminated side and/or top shield. One or more layers are NiFeMe.

DETAILED DESCRIPTION

Sensors whose side shield structure included a seed layer of NiFeMo (5 wt %)/coupled with NiFe (19 at %), showed ~15% increase in readback amplitude under the same asymmetric sigma or ~2-3% lower asymmetric sigma under the same amplitude. For these sensors, the signal to noise ratio was higher and the bit error rate was lower. Laminating the NiFeMo with CoFe in the side shield structure to enhance the magnetic moment showed that the biasing field onto the sensor was also increased. The inclusion of CoFe didn't seem to reduce the advantageous effect of the NiFeMo as the amplitude/asymmetric sigma results showed the similar improvement.

As disclosed below, and shown schematically in FIG. 2, these results suggested the use of a high magnetic permeability alloy with low coercivity (coercivity≤1.0 Oe) such as supermalloy or mu metal of general form NiFeMe (Me=Mo, Cr, Cu or any combination of these elements) for the bottom shield 22, the side shields 23 and the top shield 24 of magnetic sensor 11. The magnetic bit sensor has a top side 11$t$ that contacts the top shield, a bottom side 11$b$ that contacts the bottom shield, and the two sidewalls 11$s$ which connect the top and bottom sides, and where each sidewall adjoins one of the side shields. As the bit size shrinks into the nanometer range, interference from nearby bits onto the sensor will result in higher level of noise on the read back signal. Therefore, it is necessary to have a good shielding material surrounding the sensor. Conventionally, the bottom and top shields are made of permalloy NiFe and the side shields are made of either the hard magnetic material used for hard bias or permalloy NiFe (FIG. 1).

The use of supermalloy-like materials for the side and top shields has been found to provide better shielding protection from stray fields because of its extremely high permeability with very low coercivity. Experience has shown this to be a coercivity less than or equal to 1.0 Oe.

Today's sensor has become so advanced and complicated that it is almost impossible to predict its performance based on theoretical analysis alone. Its performance is very sensitive to the design and to the composition of the sensor, including that of the side and top shields. Therefore, it is desirable to provide additional means for tuning the performance of the side and top shields.

NiFeMe is made of 3 or more elements whose relative concentrations can be varied easily. As its composition changes this material will exhibit different properties including magnetic properties such as magnetization moment, permeability, coercivity, anisotropy Hk, and magnetostriction as well as physical properties such as resistivity, thermal conductivity, etc. Any or all these properties can have an impact on the performance of the sensor.

As illustrated in FIG. 3 for an embodiment wherein the side shield and top shield are modified to have a laminated configuration, the single side shield layer 23 of FIG. 2 may be replaced by a laminated layer 30 that consists of at least 1 layer of NiFeMe 33$a$, bias layer 34, and a non-magnetic or magnetic material 33$b$ that may be a second layer of NiFeMe. Moreover, the single top shield layer 24 in FIG. 2 may be modified to have a bilayer stack 36 with a lower non-magnetic or magnetic layer 33$c$ that may be a NiFeMe layer, and an upper hard magnetic layer 35. The advantages of lamination are as follows. Since NiFeMe has a low magnetization moment, adding a layer of higher moment material such as Ni, Co, Fe, FeNi, CoFe, FeCo, etc will increase the effective moment of the structure, thereby providing a stronger biasing field for the sensor.

Additionally, with lamination, other properties can also be changed. When used in the side and top shields, it will have different effects on the sensor and its performance. Also, with proper lamination of NiFeMe with magnetic and non-magnetic layers, the biasing flux from the side shields onto the sensor can be guided and/or enhanced or diluted for the sensor's best performance.

Additional Fabrication Details:

After the sensor profile is defined using dry etching techniques, an insulating layer is deposited for electrical isolation. After that, the side shield of single NiFeMe layer or laminated NiFeMe layers are deposited using ion beam deposition (IBD) onto the sensor. Although we used IBD, similar materials can be deposited by other techniques such as PVD. Other standard process steps were performed subsequently to clean the surface and to etch off the top surface before the top shield of single NiFeMe layer or laminated NiFeMe layers are deposited. Similarly, this step can also be performed using other techniques such as PVD.

What is claimed is:

1. A magnetic read head having a magnetic bit sensor that is shielded against noise originating from recorded bits other than a magnetic bit that is being sensed, comprising:
   a bottom shield;
   on a portion of said bottom shield, a magnetic bit sensor that includes top and bottom sides, and sidewalls which connect the top and bottom sides, and a free layer;
   a side shield that contacts the magnetic bit sensor sidewalls consisting of;
      (a) layer of magnetic material positioned so as to provide a fixed magnetic bias at said free layer; the layer of magnetic material contacts a top surface of a first magnetic layer and adjoins a bottom surface of a second magnetic layer;
      (b) the first magnetic layer that is NiFeMe, where Me is selected from the group consisting of Mo, Cr, and Cu, whereby said NiFeMe layer has a coercivity that is less than or equal to 1.0 Oe and contacts the bottom shield and the magnetic bit sensor sidewalls; and
      (c) the second magnetic layer that contacts a top shield and the magnetic bit sensor sidewalls; and
   the top shield that fully contacts the magnetic bit sensor top side, and covers said magnetic bit sensor and said side shield.

2. The magnetic read head described in claim 1 wherein the layer of magnetic material is selected from the group consisting of Ni, Co, Fe, FeNi, and FeCo to increase said magnetic bit sensor's effective moment.

3. The magnetic read head described in claim 1 wherein said top shield comprises one or more layers of NiFeMe, where Me is selected from the group consisting of Mo, Cr, and Cu, whereby each of said one or more NiFeMe layers in the top shield has coercivity that is less than or equal to 1.0 Oe.

4. The magnetic read head described in claim 1 wherein both said top shield and said bottom shield each comprise one or more layers of NiFeMe, where Me is selected from the group consisting of Mo, Cr, and Cu, whereby each of said one or more NiFeMe layers in the top and bottom shields has a coercivity that is less than or equal to 1.0 Oe.

5. The magnetic read head of claim 1 wherein the top shield consists of a bilayer stack with a lower NiFeMe layer wherein Me is selected from a group consisting of Mo, Cr, and Cu that contacts the top side of the magnetic bit sensor, and an upper layer made of a magnetically hard material.

6. The magnetic read head of claim 1 wherein the second magnetic layer is a NiFeMe layer wherein Me is selected from a group consisting of Mo, Cr, and Cu.

* * * * *